United States Patent
Rogge et al.

(10) Patent No.: US 9,366,344 B2
(45) Date of Patent: Jun. 14, 2016

(54) VALVE DEVICE FOR A COMBUSTION ENGINE

(75) Inventors: Thomas Rogge, Steinfurt (DE); Rainer Gramss, Hodenhagen (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 439 days.

(21) Appl. No.: 13/322,388

(22) PCT Filed: May 4, 2010

(86) PCT No.: PCT/US2010/033473
§ 371 (c)(1),
(2), (4) Date: Nov. 23, 2011

(87) PCT Pub. No.: WO2010/138279
PCT Pub. Date: Dec. 2, 2010

(65) Prior Publication Data
US 2012/0080629 A1   Apr. 5, 2012

(30) Foreign Application Priority Data

May 27, 2009   (DE) .......................... 10 2009 024 317

(51) Int. Cl.
*F16K 5/00* (2006.01)
*F16K 5/06* (2006.01)
*F16K 41/02* (2006.01)
(Continued)

(52) U.S. Cl.
CPC ............. *F16K 5/0647* (2013.01); *F16C 23/045* (2013.01); *F16K 41/026* (2013.01); *F16K 41/046* (2013.01)

(58) Field of Classification Search
CPC ... F16K 5/0694; F16K 41/026; F16K 41/046; F16K 41/06; F16C 23/045

USPC ............ 251/214, 304, 315.1, 315.16, 315.01, 251/315.08; 384/206
See application file for complete search history.

(56) References Cited

U.S. PATENT DOCUMENTS 1,562,130 A * 11/1925 Stitzinger ...................... 384/213
2,228,394 A *  1/1941 Marvin et al. ................ 384/206
2,719,022 A *  9/1955 Blevans ........................ 251/163
(Continued)

FOREIGN PATENT DOCUMENTS

CN       86202079 U    3/1987
DE        2908177 A1   9/1980
(Continued)

OTHER PUBLICATIONS

ISR for PCT/US2010/033473 dated Aug. 19, 2010.

*Primary Examiner* — R. K. Arundale
(74) *Attorney, Agent, or Firm* — Hauptman Ham, LLP

(57) ABSTRACT

A valve device for a combustion engine, comprising a housing with at least two fluid connections, a hollow valve element, being rotatably supported in the housing between at least two rotational positions, the valve element comprising at least two openings, which, dependent on the rotational position of the valve element can be connected with the fluid connections of the housing, and a drive for rotating the valve element. The valve element is connected torque proof with a shaft, the shaft being rotatably supported at two opposing bearings of the housing, and the shaft, at least at one end, being rotatably supported in a bearing bush, the bearing bush being received at one of the bearings torque proof against a rotation about the shaft axis, with the inner surface and/or the outer surface of the bearing bush being formed spherically.

14 Claims, 5 Drawing Sheets

(51) Int. Cl.
*F16K 41/04* (2006.01)
*F16C 23/04* (2006.01)

(56) References Cited

U.S. PATENT DOCUMENTS

| | | | | |
|---|---|---|---|---|
| 2,932,081 A | * | 4/1960 | Witte | 29/898.047 |
| 3,122,352 A | * | 2/1964 | Anderson | 251/172 |
| 3,272,472 A | * | 9/1966 | Goldman | 251/172 |
| 3,445,087 A | * | 5/1969 | Davies et al. | 251/172 |
| 4,022,424 A | * | 5/1977 | Davis et al. | 251/214 |
| 4,771,144 A | * | 9/1988 | Goyarts | 200/306 |
| 4,840,498 A | * | 6/1989 | Lichtfuss | 384/213 |
| 5,971,010 A | * | 10/1999 | Kallberg et al. | 137/340 |
| 6,129,336 A | * | 10/2000 | Sandling et al. | 251/214 |
| 6,135,414 A | * | 10/2000 | Mohtar | 251/58 |
| 7,963,455 B2 | | 6/2011 | Heldberg et al. | |
| 8,579,256 B2 | * | 11/2013 | Wetzel et al. | 251/315.13 |
| 2001/0032952 A1 | * | 10/2001 | Lah | 251/214 |

FOREIGN PATENT DOCUMENTS

| | | |
|---|---|---|
| DE | 8903812 U1 | 5/1989 |
| DE | 10351852 A1 | 6/2005 |
| DE | 102006038213 A1 | 2/2008 |
| GB | 1503809 A | 3/1978 |

* cited by examiner

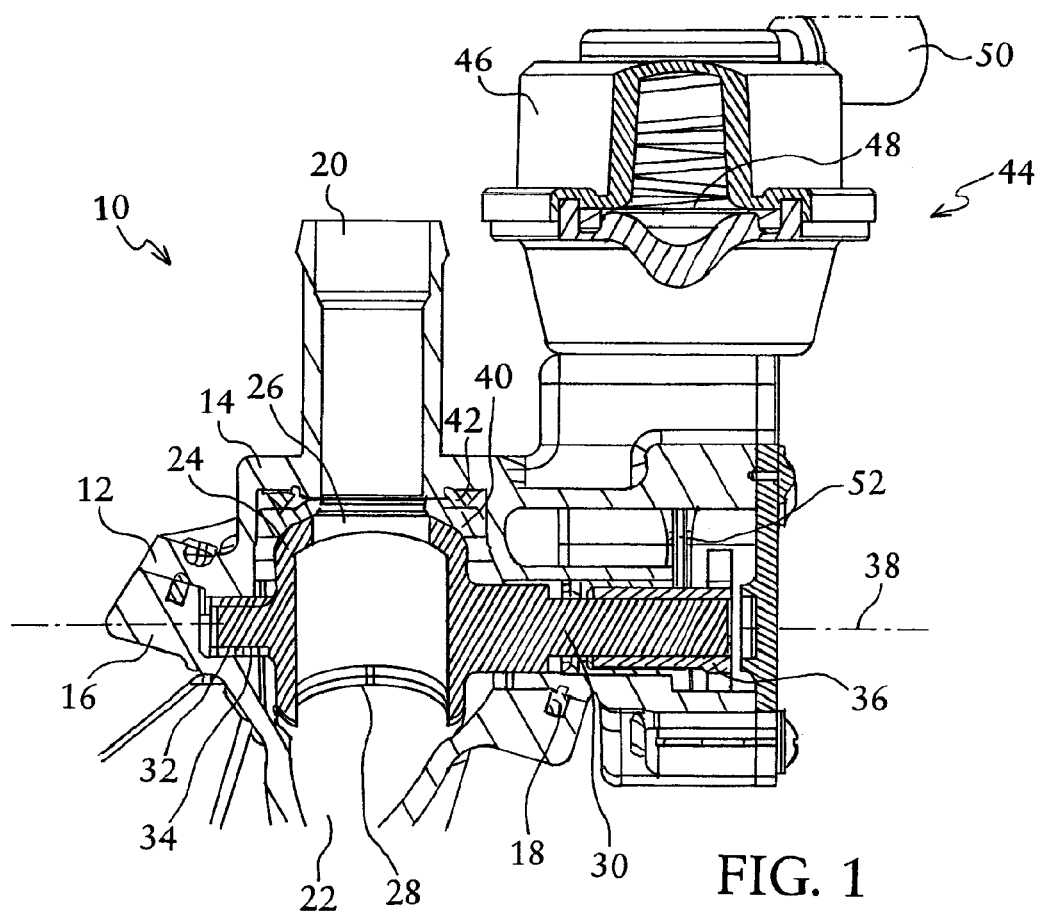
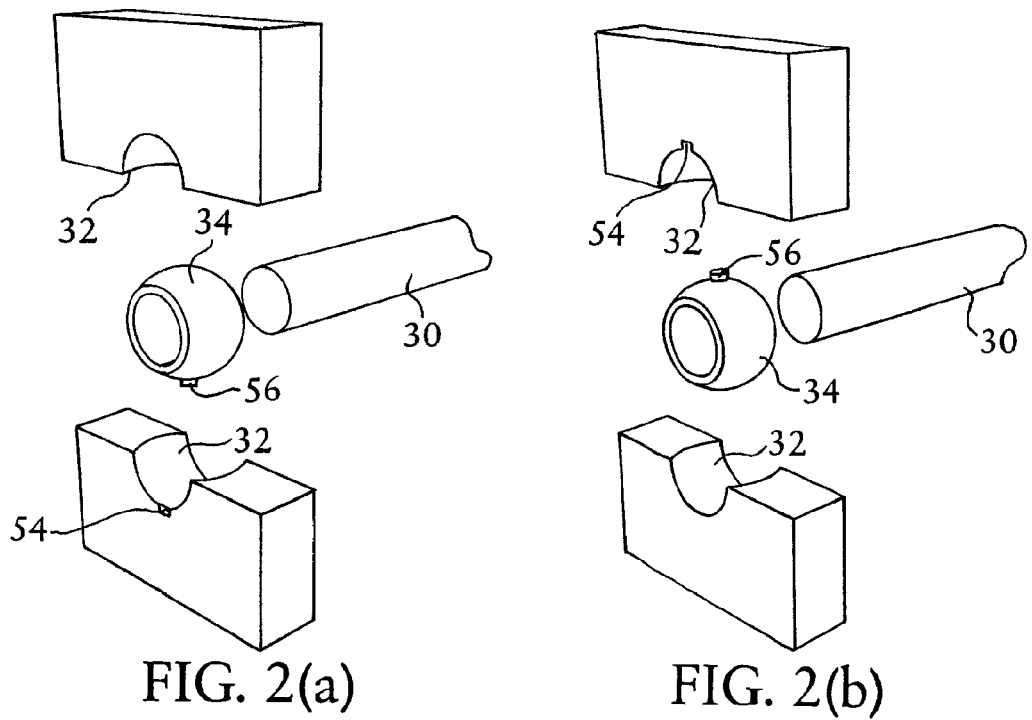
FIG. 1
FIG. 2(a)    FIG. 2(b)

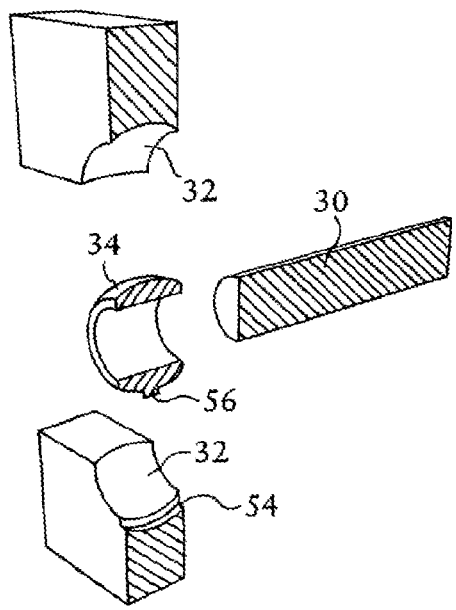
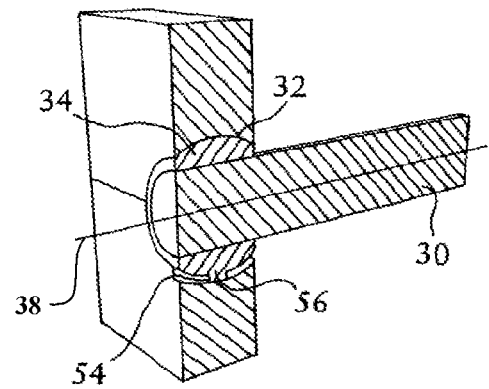
FIG. 3(b)
FIG. 3(a)
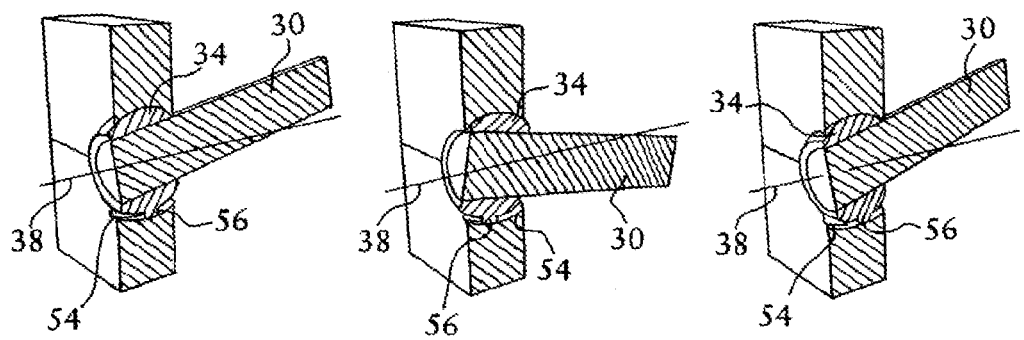
FIG. 4(a)   FIG. 4(b)   FIG. 4(c)

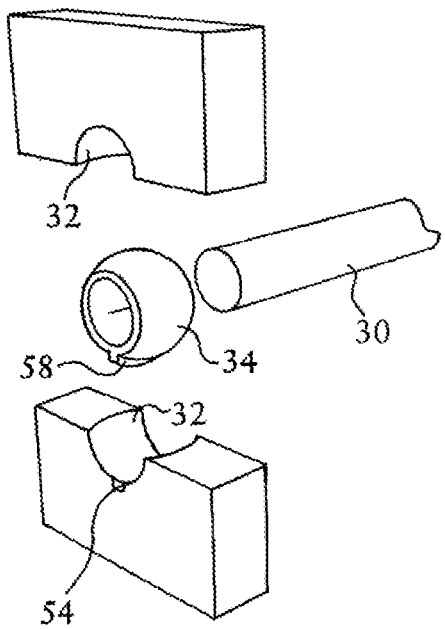
FIG. 5(a)
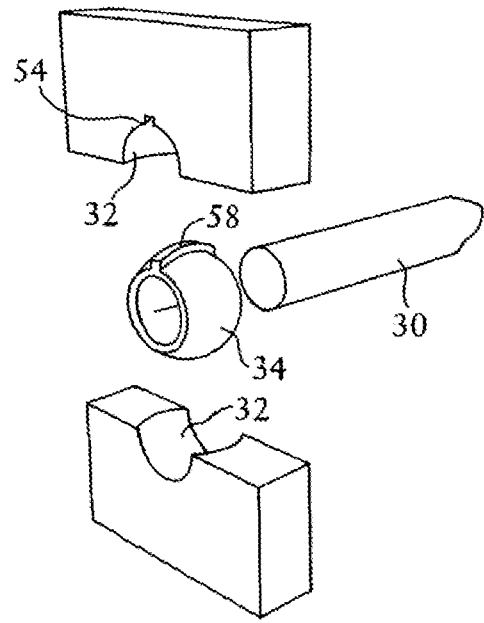
FIG. 5(b)
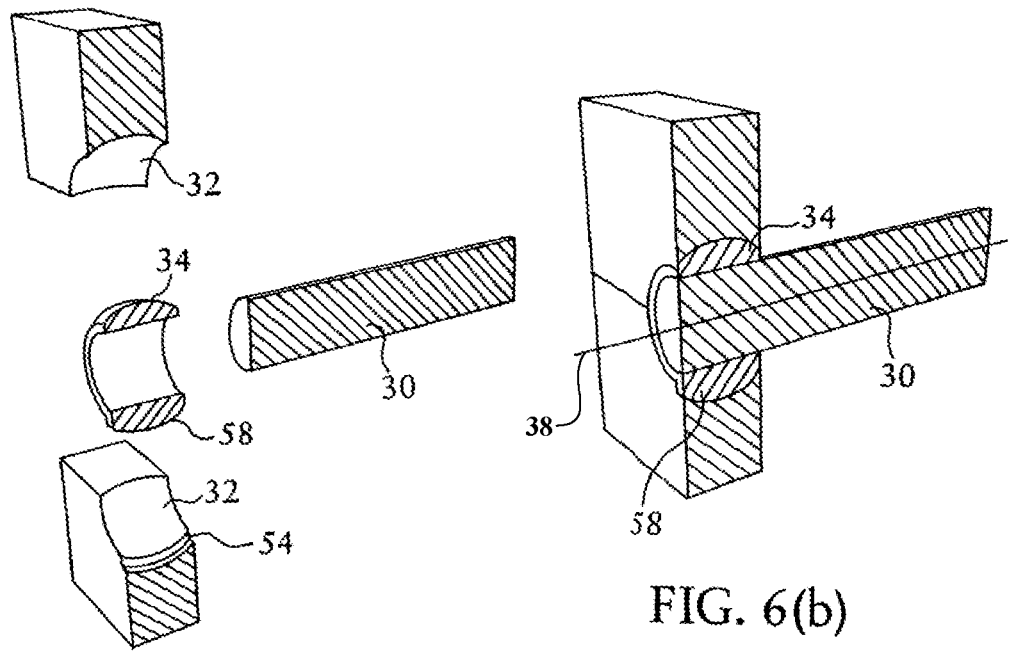
FIG. 6(a)
FIG. 6(b)

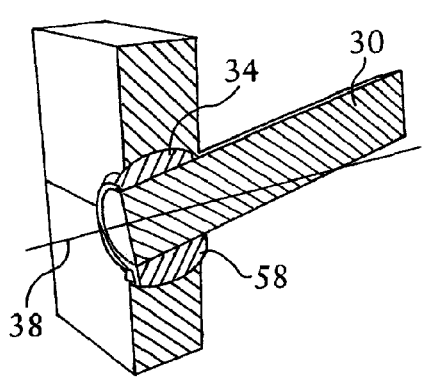
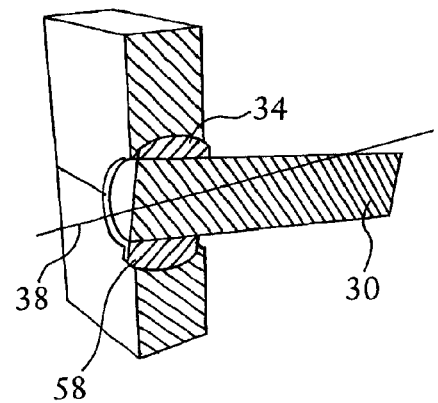
FIG. 7(a)                    FIG. 7(b)
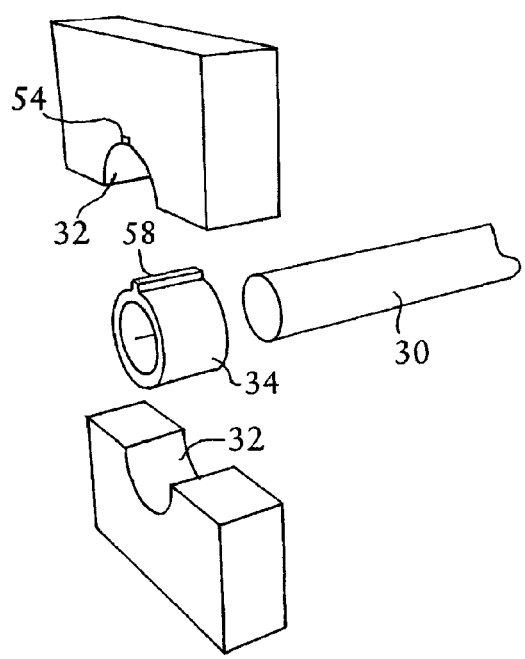
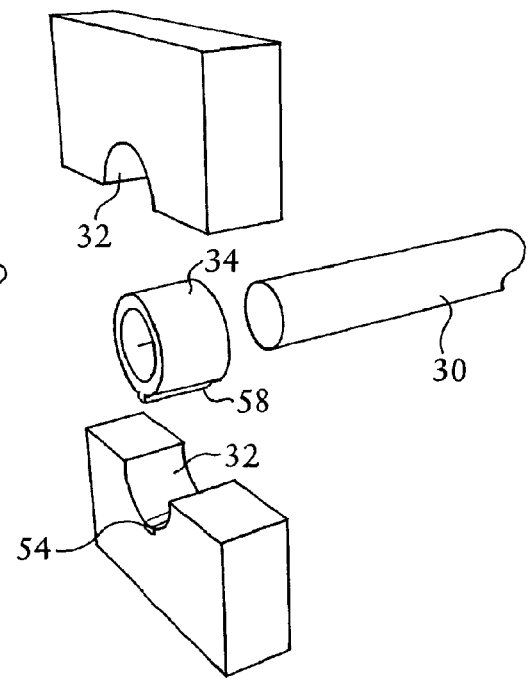
FIG. 8(a)                    FIG. 8(b)

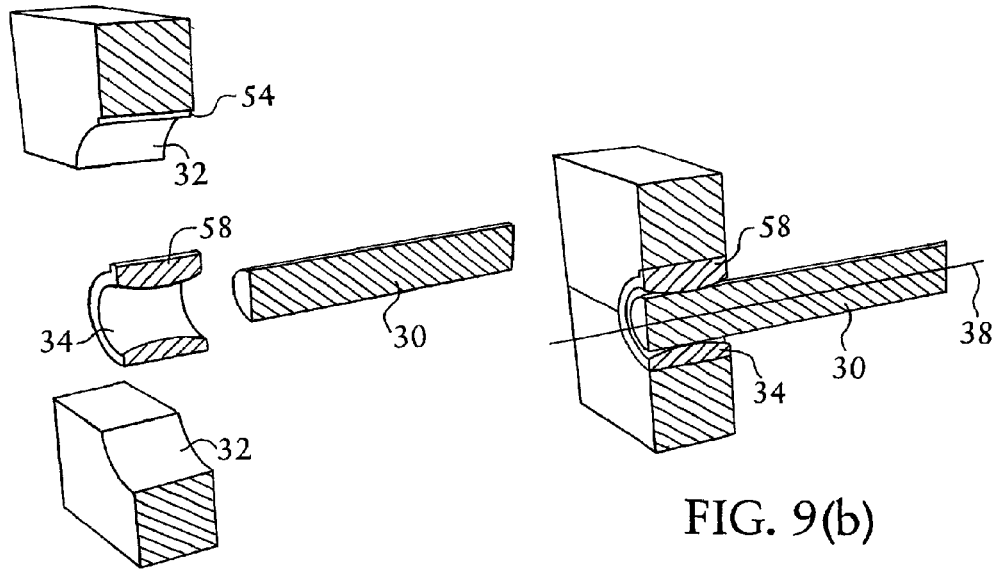
FIG. 9(a)
FIG. 9(b)
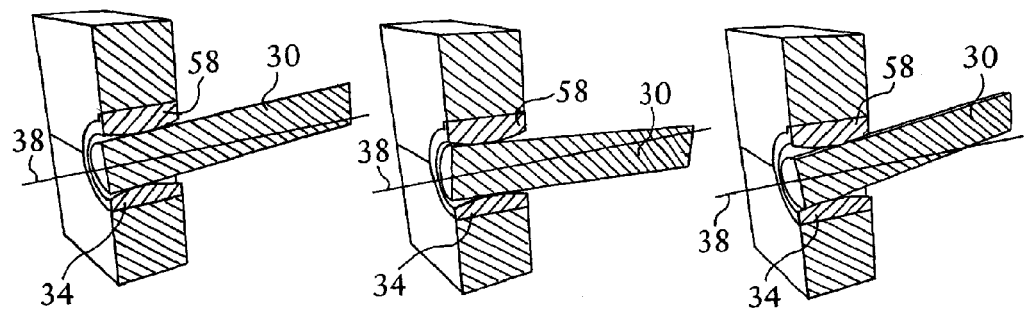
FIG. 10(a)   FIG. 10(b)   FIG. 10(c)

VALVE DEVICE FOR A COMBUSTION ENGINE

RELATED APPLICATIONS

The present application is national phase of PCT/US2010/033473 filed May 4, 2010, and claims priority from German Application Number 10 2009 024 317.8 filed May 27, 2009.

The invention relates to a valve device for a combustion engine, in particular of an automobile, comprising a housing with at least two fluid connections, a hollow valve element, being rotatably supported in the housing between at least two rotational positions, said valve element comprising at least two openings, which dependent on the rotational position of the valve element can be connected with the fluid connections of the housing, and a drive for rotating the valve element. Such valve devices are used for example in cooling circuits for automobile combustion engines. Multi-way valve elements are often provided for this purpose, suitable rotational positions thereof allowing cooling liquid to be fed from a cooling liquid supply either to the engine block, a bypass or indeed a heating circuit of the vehicle. Such devices are known from DE 103 51 852 A1 or DE 10 2006 038 213 A1.

The devices generally have a sealing device, which seals the valve element relative to the housing, such that no liquid can escape from the device. Where there are relatively large component tolerances, it may so happen, however, that the valve element is not supported accurately on the bearings provided. This is possible in particular in the case of components produced by injection molding, as are often used in such devices. This may impair the sealing function, so allowing fluid to escape in an undesired manner. In addition, component tolerances or indeed soiling may lead to impairment of the rotatability of the valve element in the housing.

On the basis of the above-described prior art, the object of the invention is to provide a valve device of the above-mentioned type in which tightness and proper functioning are reliably ensured at all times.

This object is achieved by the subject matter of claim 1. Advantageous configurations may be found in the dependent claims, the description and the figures.

For a valve device of the above-mentioned type, the invention achieves the object in that the valve element is connected torque proof with a shaft, which shaft is rotatably supported at two opposing bearings of the housing, wherein the shaft is at least at one end rotatably supported in a bearing bush, which bearing bush is received at one of the bearings torque proof against a rotation about the shaft axis, wherein the inner surface and/or the outer surface of the bearing bush is formed spherically.

The valve device may be provided in particular for cooling liquid for a combustion engine of an automobile and thus form part of a cooling water controller of such a cooling system. Other applications are also feasible, however, for example for conveying lubricant, such as oil. As known per se, the housing may have two or more connections. The same applies to the valve element. In the simplest case, in particular, the housing may comprise two fluid connections and the valve element two openings. The valve element may be rotatable between two rotational end positions offset for example by 90°. In the first rotational end position, the valve element opens up a passageway between the two fluid connections of the housing, while in the second rotational end position it closes this passageway. The provision of three or four (or more) connections for the housing is also feasible, however, the valve element having two or more than two openings, such that different connections of the housing may be connected together as desired. The connections may lead, for example, to a cooling liquid supply, cooling ducts of the engine block and a bypass for conveying the cooling liquid past the engine block and/or optionally also to a heating circuit of the vehicle. Depending on requirements, in particular on the temperature of the combustion engine, cooling liquid may then be fed wholly or in part to the engine block or diverted via the bypass.

The shaft connected with the valve element is rotated by a drive. The drive may, for example, be a pneumatic drive, with a vacuum pressure cell or the like, and a suitable diaphragm for pressure transmission. Other drives are also feasible, however, for example electromotive drives. Suitable sensors, for example temperature sensors, may additionally be provided, actuation of the drive proceeding in accordance with the measurement result thereof. Thermostatic drive by way of an expansion material is likewise feasible. In this case largely automatic drive control takes place in the manner of a thermostat.

The valve device may moreover comprise a sealing device conformed to the shape of the valve element. To this end, it may have a sealing ring or the like resting sealingly against the outer surface of the valve element, past which sealing ring or the like the valve element is rotated sealingly. The sealing device seals the valve element relative to the housing, such that no liquid can escape from the device.

According to the invention, the shaft is supported at least at one end in a bearing bush, whose inner surface in contact with the shaft and/or whose outer surface in contact with the bearing is formed spherically. The outer surface of the bearing bush may for example be convexly formed. The inner surface of the bearing bush may for example likewise be convexly formed. However, it is also possible for the outer and/or inner surface of the bearing bush to be concavely formed.

If the outer surface of the bearing bush is spherical, for example convex, the inner surface, receiving the bearing bush, of the bearing of the housing may accordingly be spherically, e.g. concavely, formed.

The spherical shape according to the invention of the bearing bush allows eccentric positioning, i.e. positioning deviating (for example perpendicularly) from the desired shaft axis, of one or both of the bearings supporting the shaft, as may occur due to component deviations or soiling. The invention thus allows a degree of swiveling of the shaft in the bearing about at least one swivel axis extending perpendicularly to the shaft axis. The convexity of the bearing bush ensures that the valve element always adopts the correct position in the housing even in the case of such swiveling. This in turn at all times ensures reliable tightness of the valve device. At the same time stress-free support is provided and problem-free and low-friction rotation of the shaft is possible even in the event of component deviations or soiling.

In this respect, the shaft is supported rotatably in the region of its two ends. It may be supported in particular in the region of its two ends in each case in a corresponding bearing bush, the inner surface and/or outer surface of said bearing bush being formed spherically in the manner according to the invention. This further improves the support and thus the tightness and rotatability of the valve element. In general it will be sufficient to construct either the outer surface of the bearing bush or the inner surface of the bearing bush to be spherical. The possibility of forming both the outer surface and the inner surface of the bearing bush spherically is not ruled out, however. Convexity of the inner surface of the bearing bush in contact with the shaft particularly effectively reduces the risk of the shaft jamming due to soil penetrating between the shaft and the bearing bush in the course of rotation of the shaft.

The valve element may be ball-shaped, in particular it may take the form of a ball segment or ball cup. A ball shape is structurally particularly simple. In principle, however, any other rotationally symmetrical shapes are also feasible for the valve element, for example a cylindrical shape or an ellipsoidal shape.

According to a further configuration, the bearing bush may on its outer surface comprise a projection running in the axial direction of the shaft, which projection is guided in a groove of the bearing receiving the bearing bush, said groove also running in the axial direction of the shaft. This particularly reliably ensures accommodation of the bearing bush which is torque proof against rotation in the bearing about the shaft axis. This configuration allows a two-dimensional movement of the bearing bush and thus of the shaft in a for example vertical plane extending along the axis of rotation thereof. Swiveling of the shaft about a single swivel axis extending perpendicularly to the shaft axis is made particularly possible, said swiveling being predetermined by the shape and position of the groove and projection. To this end the groove and the projection may be cross-sectionally rectangular, for example. In kinematic reverse, the bearing bush may in its outer surface comprise a groove running in the axial direction of the shaft, in which groove a projection of the bearing receiving the bearing bush is guided, said projection also running in the axial direction of the shaft. The projection formed on the bearing bush or the groove and the groove formed on the bearing bush or the projection may in each case extend over the entire length of the bearing bush.

According to a further configuration, the bearing bush may on its outer surface comprise a rotationally symmetrical projection, in particular a cylindrical projection, which projection is guided in a groove of the bearing receiving the bearing bush, said groove running in the axial direction of the shaft. This configuration in turn particularly simply allows torque proof accommodation of the bearing bush against rotation in the bearing about the shaft axis. At the same time, three-dimensional movement of the bearing bush and thus of the shaft is possible not just in one plane, but rather in any desired planes extending perpendicular to the shaft axis. The shaft may thus be swiveled about any desired swivel axes extending perpendicular to the shaft axis. This leads to greater freedom of movement and thus better tolerance compensation and further ensures tightness and functioning of the valve device. In kinematic reverse, the bearing bush may in its outer surface again comprise a groove running in the axial direction of the shaft, in which groove a rotationally symmetrical projection, in particular a cylindrical projection, of the bearing receiving the bearing bush is guided. The rotationally symmetrical projection, whether formed on the bearing bush or on the bearing, may be formed centrally on the bearing bush or the bearing in the axial direction of the shaft, in order to allow particularly smooth movement of the shaft. If the rotationally symmetrical projection is a cylindrical projection, the cylinder axis may in particular stand perpendicularly on the outer surface of the bearing bush or the inner surface of the bearing.

For a particularly compact structure, according to a further configuration the drive may comprise a drive rod, for example a piston rod, extending perpendicularly to the shaft connected to the valve element, which rod is movable in its axial direction by means of the drive and acts on the shaft connected with the valve element via an eccentric device. In the event of axial movement of the drive rod, said axial movement of the drive rod is then converted into rotation by means of the eccentric device, for example an eccentric leg acting eccentrically on the shaft connected to the valve element, and thus brings about rotation of the shaft connected to the valve element and thus of the valve element.

An exemplary embodiment of the invention is explained in greater detail below with reference to schematic figures, in which:

FIG. 1 shows a portion of a valve device according to the invention in a partially sectional view, FIG. 2 shows two perspective exploded representations of a support according to the invention according to a first exemplary embodiment, FIG. 3 shows the support shown in FIG. 2 in two perspective sectional views, FIG. 4 shows the support shown in FIG. 3 in three operating states in perspective sectional views, FIG. 5 shows two perspective exploded representations of a support according to the invention according to a second exemplary embodiment, FIG. 6 shows the support shown in FIG. 5 in two perspective sectional views, FIG. 7 shows the support shown in FIG. 6 in two operating states in perspective sectional views, FIG. 8 shows two perspective exploded representations of a support according to the invention according to a third exemplary embodiment, FIG. 9 shows the support shown in FIG. 8 in two perspective sectional views, and FIG. 10 shows the support shown in FIG. 9 in three operating states in perspective sectional views.

Unless otherwise indicated, in the figures the same reference numerals are used to denote the same items. FIG. 1 shows a portion, in partial vertical section, of a valve device 10 according to the invention. The valve device 10 has a housing 12, which in the example illustrated substantially comprises an upper housing half and a lower housing half 16 connected, for example screwed, tightly thereto via a sealing ring 18. In the example illustrated, the housing 12 has two fluid connections 20, 22, which are provided in this case for conveying cooling liquid for a combustion engine of an automobile. A ball cup-shaped valve element 24 is arranged in the housing 12. In the example illustrated, the valve element 24 likewise has two openings 26, 28, which communicate with one another. It goes without saying that the housing 12 and/or the valve element 24 may also have more than two connections or openings. The valve element 24 is connected in one piece with a shaft 30 supported rotatably in the housing 12. At its two ends the shaft 30 is supported rotatably on corresponding bearings 32, 36 of the housing 12. While at its right-hand end in FIG. 1 the shaft 30 is supported directly on a bearing 36 of the housing 12 by means of a suitable journal, at its opposite, left-hand end in FIG. 1 the shaft 30 is supported by way of a bearing bush 34 arranged in the bearing 32 so as to be torque proof against rotation in the axial direction of the shaft 30. The axis of rotation of the shaft 30 is shown schematically in FIG. 1 at reference numeral 38. The support according to the invention of the shaft 30, not shown in detail in FIG. 1, will be looked at in greater detail below.

The valve element 24 is thus rotated by rotation of the shaft 30. In the example illustrated, the shaft 30 and thus the valve element 24 may be rotated between two rotational end positions offset by 90° relative to one another. In the first rotational end position, which is shown in FIG. 1, the mutually communicating openings 26, 28 of the valve element 24 connect together the two fluid connections 20 and 22 of the housing 12. In the rotational end position rotated by 90° (not shown), on the other hand, the valve element 24 closes the connection between the fluid connections 20 and 22 and thus the passageway for cooling liquid.

FIG. 1 further shows a sealing device comprising a sealing ring 40, which is pressed by way of an elastomeric ring 42 onto the outer surface of the valve element 24. The sealing device and in particular the sealing ring 40 seals the valve element 24 off relative to the housing 12, such that the cooling liquid conveyed through the fluid connections 20, 22 cannot escape from the valve device 10. In addition, FIG. 1 schematically illustrates a drive 44 for turning the shaft 30 and thus the valve element 24. In the example shown, the drive is a pneumatic drive 44 with a vacuum pressure cell 46, which is shown partially cut open in FIG. 1 for the purposes of illustration. In the vacuum pressure cell 46 a diaphragm 48 is arranged, which may be moved up and down by way of a vacuum connection 50. In a manner not shown in greater detail in FIG. 1 but known per se, the diaphragm 48 is connected to a piston rod 52. An up-and-down movement of the diaphragm 48 accordingly brings about an up and down movement of the piston rod 52. The piston rod 52 acts via an axle pivot, not shown in any greater detail in FIG. 1, eccentrically on the shaft 30. By means of this eccentric device, the up-and-down movement of the piston rod is translated into a corresponding rotation of the shaft 30 and thus of the valve element 24. A sensor not shown in FIG. 1, for example a temperature sensor, may for example measure the temperature of the combustion engine. The drive 44 may then be actuated by means of a control means processing the measurement results, in order to produce or interrupt as desired the connection between the fluid connections 20, 22 by way of the valve element 24.

It is apparent that the housing 12 is here composed of two housing half shells 14, 16. These half-shells 14, 16 define the position of the bearings 32, 36. Precisely in the case of plastics housing parts produced by injection molding, there is often a degree of component dimensional tolerance. This leads to inaccuracies in supporting the shaft 30. Soil may also penetrate into the bearing. Leaks may then arise in the region of the sealing device or other malfunctioning, such as jamming of the valve element. To solve this problem the invention proposes a support arrangement which is shown schematically in a number of exemplary embodiments in FIGS. 2 to 10.

Subfigure a) of FIG. 2 is a highly schematic representation of a bearing 32 of the housing 12 composed of two half shells. In FIG. 2*b*) the bearing arrangement of FIG. 2*a*) is shown in a second view. In the example the bearing 32 comprises in its inner surface a cross-sectionally rectangular recess 54 extending in the axial direction of the shaft 30. This is easy to see for example in the exploded view in FIG. 3*a*). It is additionally apparent that the inner surface of the bearing 32 is concavely spherical. A bearing bush 34 in the form of a ball segment is inserted into the bearing 32. The bearing bush 34 has on its outer surface a central cylindrical projection 56, which is guided when mounted as shown in FIG. 3*b*) in the groove 54 of the bearing 32. The bearing bush 34 has a cylindrical axial opening, into which the likewise cylindrical shaft 30 is inserted rotatably for support (FIG. 3*b*)).

While rotation of the bearing bush 34 about the axis of rotation of the shaft 30 is prevented by interaction of the cylindrical projection 56 and the groove 54, the spherical convex outer surface of the bearing bush 34 and the corresponding spherical concave inner surface of the bearing 32 does allow swiveling of the shaft 30 about a swivel axis extending perpendicular to the shaft axis 38. This is shown in FIGS. 4*a*) and 4*b*) for two different operating states. In the example this swivel axis extends along the parting line of the upper and lower halves of the bearing 32 and through the plane of the drawing. Furthermore guidance of the cylindrical projection 56 in the longitudinal groove 54 allows three-dimensional movement of the shaft 30. The shaft may in particular also be swiveled about a swivel axis extending perpendicularly to the parting plane between the two bearing halves 32 and the shaft axis 38 and in the plane of the drawing, as shown in FIG. 4*c*) for a further operating state. This configuration of the support according to the invention allows component tolerances to be compensated and the damaging effect of soiling to be minimized, such that the tightness and functioning of the valve device according to the invention is ensured at all times.

FIGS. 5, 6 and 7 show a second configuration of the bearing according to the invention. This configuration largely corresponds to the arrangement shown in FIGS. 2 to 4. In contrast to the bearing arrangement shown in FIGS. 2 to 4, in this exemplary embodiment however the bearing bush 34 has a cross-sectionally rectangular projection 58 also extending in the axial direction of the shaft 30. The projection 58 corresponds in shape and configuration to the groove 45 formed in the bearing 32 and is guided therein when assembled as shown in FIG. 6*b*). In particular, the projection 58 is extended in an elongate manner in the axial direction of the bearing bush and is accordingly not rotationally symmetrical. This configuration allows two-dimensional movement of the shaft 30, in that the latter may be swiveled about a swivel axis extending perpendicularly to the shaft axis 38. In the example the swivel axis extends along the parting plane of the upper and lower halves of the bearing 32 and through the plane of the drawing. This is shown in FIGS. 7*a*) and *b*) for two operating states.

FIGS. 8 to 10 show a third exemplary embodiment of a bearing arrangement according to the invention. This configuration again largely corresponds to the configuration shown in the preceding figures. Unlike in the preceding configurations, in this exemplary embodiment, however, the outer surface of the bearing bush 34 and the corresponding inner surface of the bearing 32 are cylindrically and not spherically formed. As is particularly clear from the exploded representation in FIG. 9*a*), the bearing bush 34 has a spherical form at its inner surface, however, in particular a convexly spherical form. In the mounted state shown in FIG. 9*b*) the cylindrical shaft 30 is thus again provided with three-dimensional freedom of movement in the bearing bush 34. In particular as in the case of the configuration shown in FIG. 4, three-dimensional movements of the shaft 30 are also possible in this third exemplary embodiment. In the exemplary embodiment shown in FIGS. 8 to 10, swiveling about any desired swivel axes perpendicularly to the shaft axis 38 is here possible. The flexibility and thus the tightness and functioning of the valve device 10 is further enhanced in this exemplary embodiment. Furthermore, jamming of the shaft 30 and thus of the valve element 24 by soil entering the space between shaft and bearing bush 34 is also prevented particularly effectively in this configuration.

The invention claimed is:

1. A valve device for a combustion engine, comprising a housing with at least two fluid connections a hollow valve element, being rotatably supported in the housing between at least two rotational positions, said valve element comprising at least two openings, which dependent on the rotational position of the valve element can be connected with the fluid connections of the housing, and a drive for rotating the valve element, characterized in that the valve element is connected torque proof with a shaft, which shaft is rotatably supported at two opposing bearings of the housing, wherein the shaft is at least at one end rotatably supported in a bearing bush extending at least about half way around the shaft, which bearing bush is received at one of the bearings torque proof against a rotation about a shaft axis, wherein an inner surface of the bearing bush is formed spherically.

2. The valve device as claimed in claim 1, characterized in that the valve element is ball-shaped.

3. The valve device as claimed in claim 1, characterized in that the bearing bush on its outer surface comprises a projection running in the axial direction of the shaft, which projection is guided in a groove of the bearing receiving the bearing bush, said groove also running in the axial direction of the shaft.

4. The valve device as claimed in claim 1, characterized in that the bearing bush in its outer surface comprises a groove running in the axial direction of the shaft, in which groove a projection of the bearing receiving the bearing bush is guided, said projection also running in the axial direction of the shaft.

5. The valve device as claimed in claim 1, characterized in that the bearing bush on its outer surface comprises a rotationally symmetrical projection, which projection is guided in a groove of the bearing receiving the bearing bush, said groove running in the axial direction of the shaft.

6. The valve device as claimed in claim 1, characterized in that the bearing bush in its outer surface comprises a groove running in the axial direction of the shaft, in which groove a rotationally symmetrical projection, of the bearing receiving the bearing bush is guided.

7. The valve device as claimed in claim 1, wherein the shaft and the valve element are part of a monolithic component.

8. The valve device as claimed in claim 1, wherein the outer surface of the bearing bush is formed cylindrically.

9. The valve device as claimed in claim 1, characterized in that the bearing bush in its outer surface comprises a groove running in the axial direction of the shaft, in which groove a rotationally symmetrical cylindrical projection of the bearing receiving the bearing bush is guided.

10. The valve device as claimed in claim 1, wherein the valve device is a valve device for an automobile.

11. The valve device as claimed in claim 1, characterized in that the bearing bush on its outer surface comprises a rotationally symmetrical cylindrical projection, which projection is guided in a groove of the bearing receiving the bearing bush, said groove running in the axial direction of the shaft.

12. A valve device comprising a housing with at least two fluid connections, a hollow valve element, being rotatably supported in the housing between at least two rotational positions, said valve element comprising at least two openings, which dependent on the rotational position of the valve element can be connected with the fluid connections of the housing, and a drive for rotating the valve element, rotation of the valve element is fixed torque proof with a shaft, the shaft being rotatably supported at two opposing bearings of the housing, wherein the shaft is at least at one end rotatably supported in a bearing bush, said end being located on a side, relative to location along a shaft axis, opposite the drive, said bearing bush being received at one of the bearings torque proof against a rotation about the shaft axis, wherein an inner surface of the bearing bush is formed spherically, and the shaft is capable of being axially displaced relative to the bearing bush.

13. The valve device as claimed in claim 12, wherein the shaft and the valve element are part of a monolithic component.

14. The valve device as claimed in claim 12, wherein the outer surface of the bearing bush is formed cylindrically.

\* \* \* \* \*